US 9,225,181 B2

(12) United States Patent
Taniguchi et al.

(10) Patent No.: US 9,225,181 B2
(45) Date of Patent: Dec. 29, 2015

(54) POWER STORAGE SYSTEM WITH CONSTANT CURRENT CHARGE CONTROL OR CONSTANT VOLTAGE CHARGE CONTROL DEPENDING ON BATTERY TERMINAL VOLTAGE IN A CHARGING PROCESS (71) Applicant: Hitachi Information & Telecommunication Engineering, Ltd., Yokohama-shi (JP)

(72) Inventors: Kimiaki Taniguchi, Yokohama (JP); Fumikazu Takahashi, Yokohama (JP); Yusuke Katsuyama, Yokohama (JP); Yoshihide Takahashi, Yokohama (JP); Daisuke Ishida, Yokohama (JP); Akinori Uchida, Yokohama (JP); Susumu Nagafuchi, Yokohama (JP)

(73) Assignee: Hitachi Information & Telecommunication Engineering, Ltd., Nishi-Ku, Yokohama (JP)

( * ) Notice: Subject to any disclaimer, the term of this patent is extended or adjusted under 35 U.S.C. 154(b) by 174 days.

(21) Appl. No.: 14/062,527

(22) Filed: Oct. 24, 2013

(65) Prior Publication Data
US 2014/0117936 A1 May 1, 2014

(30) Foreign Application Priority Data
Oct. 30, 2012 (JP) .................................. 2012-239638

(51) Int. Cl.
*H02J 7/00* (2006.01)
(52) U.S. Cl.
CPC ............. *H02J 7/0019* (2013.01); *H02J 7/0075* (2013.01)

(58) Field of Classification Search
CPC ...... H02J 7/1423; H02J 7/0024; Y02E 60/12; Y02T 10/7005; Y02T 10/7055
USPC ......................................................... 320/126
See application file for complete search history.

(56) References Cited

U.S. PATENT DOCUMENTS

| 2003/0067283 A1* | 4/2003 | Takimoto et al. | 320/162 |
| 2004/0004458 A1* | 1/2004 | Tanaka et al. | 320/106 |
| 2005/0212489 A1* | 9/2005 | Denning et al. | 320/134 |
| 2005/0252546 A1* | 11/2005 | Sasaki | 136/293 |
| 2006/0087289 A1* | 4/2006 | Chen | 320/128 |
| 2009/0309547 A1* | 12/2009 | Nakatsuji | 320/134 |

FOREIGN PATENT DOCUMENTS

| CN | 101546919 A | 9/2009 |
| CN | 202197111 U | 4/2012 |
| GB | 2460743 A | 12/2009 |

* cited by examiner

Primary Examiner — Arun Williams
(74) Attorney, Agent, or Firm — R. Neil Sudol; Henry D. Coleman (57) ABSTRACT A power storage system is provided with a battery and a battery charger which charges a battery pack having a battery voltage and current detection circuit. A charge circuit is structured such as to acquire terminal voltage information of the battery from a battery voltage detection circuit of the battery pack in a charging process, carry out a constant current charge control in a state in which the terminal voltage of the battery is equal to or lower than a previously determined reference voltage value of the battery, and switch to a constant voltage charge control maintaining the output voltage of the charge circuit in the case that the terminal voltage of the battery goes beyond the reference voltage value, thereby carrying on the charge until the battery is fully charged. Therefore, the power storage system can accurately charge the battery to a prescribed amount safely.

8 Claims, 6 Drawing Sheets

FIG. 6

POWER STORAGE SYSTEM WITH CONSTANT CURRENT CHARGE CONTROL OR CONSTANT VOLTAGE CHARGE CONTROL DEPENDING ON BATTERY TERMINAL VOLTAGE IN A CHARGING PROCESS

BACKGROUND OF THE INVENTION

1. Field of the Invention

The present invention relates to a power storage system, and more particularly to a power storage system which uses a secondary battery.

2. Description of the Conventional Art

In an electric charge of a secondary battery in a power storage system in which the secondary battery and a battery charger are combined, a constant current charge and a constant voltage charge are provided. The constant voltage charge detects an output voltage of the battery charger and controls the output voltage to a constant voltage so that the battery charger controls the output voltage to a predetermined constant voltage.

In the electric charge of the battery as mentioned above, in order to accurately charge the battery to a prescribed amount safely without deteriorating a service life, it is necessary to enhance a precision for detecting the output voltage of the battery charger, and calibrate the output voltage of the battery charger at the time of shipping products.

PRIOR ART DOCUMENT

Patent Document

Patent Document 1: Japanese Unexamined Patent Publication No. 9-261886

SUMMARY OF THE INVENTION

Problem to be Solved by the Invention

In order to improve the precision for detecting the output voltage of the battery charger in the power storage system, it is necessary to use an expensive part having a high precision. As the other measure for improving the precision, there is a measure of calibrating the output voltage at the shipping time, however, this measure becomes expensive since a working man-hour is increased.

An object of the present invention is to achieve a power storage system which can accurately charge a battery to a prescribed amount safely, without improving a precision for detecting an output voltage of a battery charger, without carrying out an output voltage calibrating work at the shipping time, and without deteriorating a service life.

Means for Solving the Problem

According to the present invention, there is provided a power storage system comprising a battery charger which charges a battery pack having a battery and a battery voltage detection circuit detecting a terminal voltage of the battery, wherein the battery charger is structured such as to acquire terminal voltage detection information of the battery from the battery voltage detection circuit of the battery pack in a charging process, carry out a constant current charge control in a state in which the terminal voltage of the battery is equal to or lower than a previously determined reference voltage value of the battery (a constant voltage target value of the battery), and switch to a constant voltage charge control maintaining the output voltage of the battery charger in the case that the terminal voltage of the battery goes beyond the reference voltage value, thereby carrying on the charge until the battery is fully charged.

Further, the battery charger comprises:

a main circuit which supplies electric power to the battery pack;

a main control circuit which controls an output current and an output voltage of the main circuit;

an output current detection circuit which detects a magnitude of the output current of the main circuit so as to input to the main control circuit;

an output voltage detection circuit which detects a magnitude of the output voltage of the main circuit so as to input to the main control circuit; and an auxiliary control circuit which acquires a terminal voltage of the battery in the battery pack, compares the acquired terminal voltage with the previously determined reference voltage value, and informs the main control circuit of the fact that the terminal voltage goes beyond the reference voltage value, the main control circuit refers to an output current value which is input from the output current detection circuit, an output voltage value which is input from the output voltage detection circuit, and an information signal which is input from the auxiliary control circuit, controls the main circuit so that the main circuit sets a rated charge current value of the battery pack as a charge current control target value so as to carry out a constant current charge in a state in which the information signal is not input, and controls the main circuit so that the main circuit sets an output voltage value of the main circuit when the terminal voltage of the battery goes beyond the reference voltage value as a charge voltage control target value so as to carry out a constant voltage charge in a state in which the information signal is input.

Further, judgment of the full charge is carried out by monitoring whether or not the charge current reaches a charge completion target value.

Effect of the Invention

According to the present invention, the electric charge is structured such as to be continued until the battery is fully charged, by carrying out the constant current charge control in the state in which the terminal voltage of the battery is equal to or lower than the previously determined reference voltage value of the battery, and switching to the constant voltage charge control for maintaining the output voltage of the battery charger when the terminal voltage of the battery goes beyond the reference voltage value. As a result, it is possible to accurately charge the battery to the prescribed amount safely, without improving a precision for detecting the output voltage of the battery charger, without carrying out an output voltage calibrating work at the shipping time, and without deteriorating a service life.

DETAILED DESCRIPTION OF PREFERRED EMBODIMENT

A power storage system according to the present invention is structured such that in a power storage system having a battery charger which charges a battery pack having a battery and a battery voltage detection circuit detecting a terminal voltage of the battery, the battery charger is structured such as to acquire terminal voltage detection information of the battery from the battery voltage detection circuit of the battery pack in a charging process, carry out a constant current charge control in a state in which the terminal voltage of the battery is equal to or lower than a previously determined reference voltage value of the battery, and switch to a constant voltage charge control maintaining the output voltage of the battery charger in the case that the terminal voltage of the battery goes beyond the reference voltage value, thereby carrying on the charge until the battery is fully charged.

Specifically, the battery charger is provided with a main circuit which supplies electric power to the battery pack, a main control circuit which controls an output current and an output voltage of the main circuit, an output current detection circuit which detects a magnitude of the output current of the main circuit so as to input to the main control circuit, an output voltage detection circuit which detects a magnitude of the output voltage of the main circuit so as to input to the main control circuit, and an auxiliary control circuit which acquires terminal voltage detection information of the battery in the battery pack, compares the acquired terminal voltage detection value with the previously determined reference voltage value, and informs the main control circuit of the fact that the terminal voltage goes beyond the reference voltage value, and the main control circuit is structured such as to refer to an output current detection value which is input from the output current detection circuit, an output voltage detection value which is input from the output voltage detection circuit, and an information signal which is input from the auxiliary control circuit, control the main circuit so that the main circuit sets a rated charge current value of the battery pack as a charge current control target value so as to carry out a constant current charge in a state in which the information signal is not input, and control the main circuit so that the main circuit sets an output voltage detection value of the main circuit when the terminal voltage of the battery goes beyond the reference voltage value as a charge voltage control target value so as to carry out a constant voltage charge in a state in which the information signal is input.

Further, judgment of the full charge is structured such as to be carried out by monitoring whether or not the charge current reaches a charge completion target value.

Embodiment 1

Figure 1:
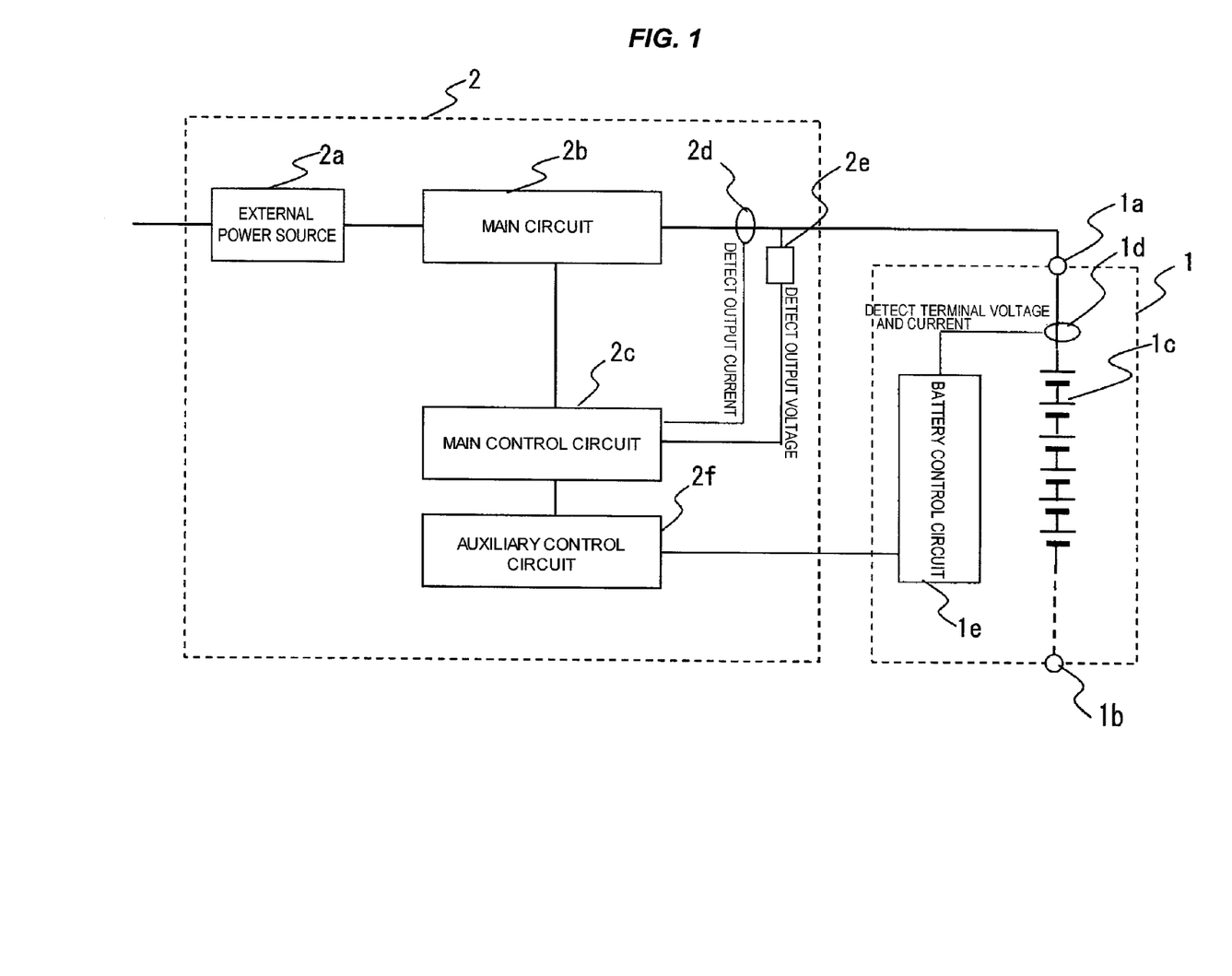
FIG. 1 is a block diagram of a power storage system and shows an embodiment 1 according to the present invention.

FIG. 1 is a block diagram of a power storage system.

The power storage system according to the embodiment is provided with a battery pack 1 and a battery charger 2.

The battery pack 1 is provided with a secondary battery 1C (for example, a lithium ion battery) which is connected to input and output terminals 1a and 1b, a battery voltage and current detection circuit 1d which detects a terminal voltage of the secondary battery 1c, and a battery control circuit 1e which transmits terminal voltage detection information of the secondary battery 1c detected by the battery voltage and current detection circuit 1d to the charge circuit 2, and controls the secondary battery 1c. Since the battery voltage and current detection circuit 1d in the battery pack 1 is means for detecting the terminal voltage and current of the secondary battery 1c serving as information for controlling the secondary battery 1c in a correct state, the battery voltage and current detection circuit 1d is structured with a high detection precision.

The battery charger 2 is provided with a main circuit 2b which receives transmitted electricity from an external power source 2a, for example, connected to a commercial power source or an electric energy source obtained from a regenerative energy such as a solar energy, and outputs DC voltage (current) so as to supply to the battery pack 1, a main control circuit 2c which controls magnitudes of output current (charge current) Iout and output voltage (charge voltage) Iout output from the main circuit 2b, an output current detection circuit 2d which detects the magnitude of the output current Iout output from the main circuit 2b so as to input to the main control circuit 2c, an output voltage detection circuit 2e which detects the magnitude of the output voltage Vout output from the main circuit 2b so as to input to the main control circuit 2c, and an auxiliary control circuit which acquires a terminal voltage detection value Vbatt of the battery 1c in communication with the battery control circuit 1e of the battery pack 1, compares the acquired terminal voltage detection value Vbatt with a previously determined reference voltage value (a constant voltage target value of the battery 1c) Vcv, and informs the main control circuit 2c of the fact that the terminal voltage detection value Vbatt goes beyond the reference voltage value Vcv.

In this connection, the output voltage detection circuit 2e is constructed by a general voltage dividing resistor or a general operational amplifier without setting any high detection precision. However, since the battery charger 2 is required a high-speed control property, the output current detection circuit 2d and the output voltage detection circuit 2e are structured such as to have a high-speed response property.

The main control circuit 2c refers to the output current detection value Iout which is input from the output current detection circuit 2d, the output voltage detection value Vout which is input from the output voltage detection circuit 2e, and the information signal which is input from the auxiliary control circuit 2f, controls the main circuit 2b so that the main circuit 2b sets a rated charge current value Ilimit of the battery pack 1 as a charge current control target value Iref and carries out a constant current charge in a state in which the information signal is not input (in a state in which the terminal voltage of the battery 1c is equal to or lower than a reference voltage value corresponding to a constant voltage target value of the battery 1 (Vbatt≤Vcv)), and controls the main circuit 2b so that the main circuit 2b sets an output voltage detection value Vout' of the main circuit 2b when the terminal voltage detection value Vbatt of the battery 1c goes beyond the reference voltage value Vcv as a charge voltage control target value Vref and carried out a constant voltage charge in a state in which the information signal is input (in a state in which the terminal voltage detection value Vbatt of the battery 1c goes beyond the reference voltage value Vcv corresponding to the constant voltage target value of the battery 1: Vatt>Vcv).

The control that the main control circuit 2c switches the main circuit 2b from the constant current charge control to the constant voltage charge control is not required a quick response, however, is desirably carried out by accurately detecting the terminal voltage of the battery 1c. As a result, the auxiliary control circuit 2f of the battery charger 2 acquires the accurate terminal voltage detection value Vbatt of the battery 1c from the battery control circuit 1e of the battery pack 1, compares the acquired terminal voltage detection value Vbatt with the reference voltage value Vcv, and informs the main control circuit 2c of the fact that the terminal voltage detection value Vbatt goes beyond the reference voltage value Vcv, thereby carrying out the control for switching from the constant current charge control to the constant voltage charge control with the accurate terminal voltage (the terminal voltage detection value Vbatt).

The output voltage detection value Vout' of the main circuit 2b which the main control circuit 2c inputs from the output voltage detection circuit 2e includes an error in correspondence to the detection precision of the output voltage detection circuit 2e, at the switching control time. However, the output voltage detection value Vout' including the detection error corresponds to the accurate terminal voltage detection value Vbatt of the battery 1c which is acquired from the battery control circuit 1e of the battery pack 1. In other words, the output voltage detection value Vout' corresponds to the constant voltage target value (the reference voltage value Vcv) of the battery 1c. Therefore, the main control circuit 2c carries out the constant voltage charge control by setting the output voltage detection value Vout' of the main circuit 2b which is input from the output voltage detection circuit 2e at the switching control time to the charge voltage control target value Vref (Vref=Vout'=Vcv), whereby the main circuit 2b can charge the battery 1c at a constant voltage by outputting a constant voltage which is equal to the constant voltage target value (the reference voltage value Vcv) of the battery 1c.

Figure 2:
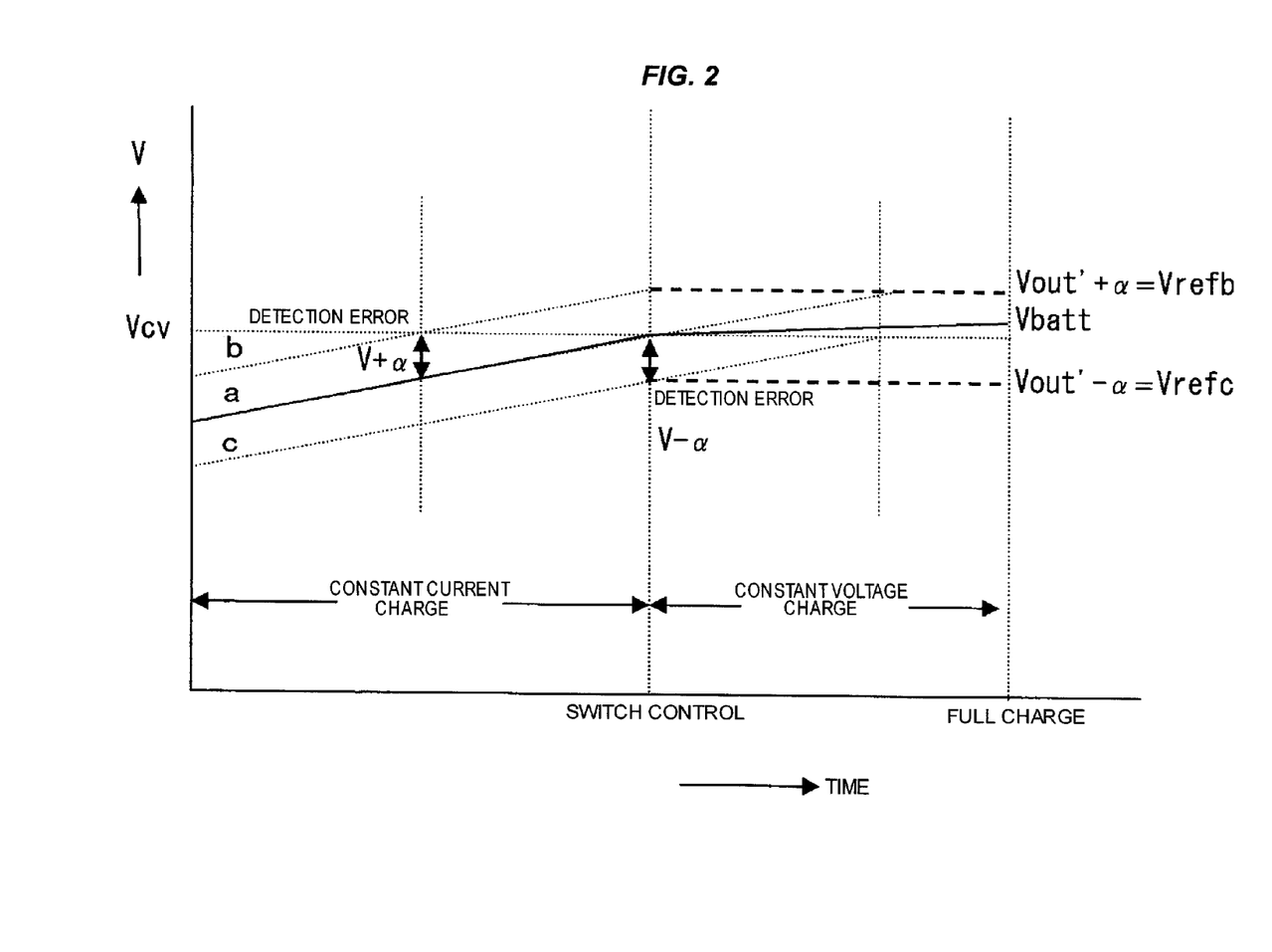
FIG. 2 is a schematic view showing a constant voltage charge control property in the embodiment 1.

FIG. 2 shows a relationship among the output voltage detection value Vout' of the main circuit 2b by the output voltage detection circuit 2e of the battery charger 2 in the switching control, the terminal voltage detection value Vbatt of the battery 1c by the battery voltage and current detection circuit 1d of the battery pack 1, and the charge voltage target value Vref.

On the assumption that the terminal voltage detection value Vbatt (a characteristic a) by the battery voltage and current detection circuit 1d of the battery pack 1 is authentic, and a detection error +α is included in the output voltage detection value Vout' (a characteristic b) by the output voltage detection circuit 2e, in the case of switching so as to carry out the constant voltage charge by setting the output voltage detection value Vout'+α when the output voltage detection value Vout'+α by the output voltage detection circuit 2e reaches the constant voltage target value (the reference voltage value Vcv) to the charge voltage target value Vref, the output voltage Vout is obtained by expression output voltage detection value Vout'−α. Accordingly, a short charge is caused. However, according to the present invention, since the switching operation is executed so that the constant voltage charge is carried out by setting the output voltage detection value Vout'+α of the output voltage detection circuit 2e when the terminal voltage detection value Vbatt (the characteristic a) by the battery voltage and current detection circuit 1d reaches the constant voltage target value (the reference voltage value Vcv) to a charge voltage target value Vrefb, the output voltage Vout of the main circuit 2b is controlled to the constant voltage target value (the reference voltage value Vcv) and comes to the accurate constant voltage charge.

On the contrary, on the assumption that the a detection error −α is included in the output voltage detection value Vout' (a characteristic c) by the output voltage detection circuit 2e, in the case of switching so as to carry out the constant voltage charge by setting the output voltage detection value Vout'−α when the output voltage detection value Vout'−α by the output voltage detection circuit 2e reaches the constant voltage target value (the reference voltage value Vcv) to the charge voltage target value Vref, the output voltage Vout is obtained by expression output voltage detection value Vout'+α. Accordingly, an excessive charge is caused. However, according to the present invention, since the switching operation is executed so that the constant voltage charge is carried out by setting the output voltage detection value Vout'−α of the output voltage detection circuit 2e when the terminal voltage detection value Vbatt (the characteristic a) by the battery voltage and current detection circuit 1d reaches the constant voltage target value (the reference voltage value Vcv) to a charge voltage target value Vrefc, the output voltage Vout of the main circuit 2b is controlled to the constant voltage target value (the reference voltage value Vcv) and comes to the accurate constant voltage charge.

However, in the constant voltage charge, voltage drop (wiring drop voltage) corresponding to product of impedance of a wiring connecting both elements and charge current exists between the terminal voltage of the battery 1c in the battery pack 1 and the output voltage of the main circuit 2b in the battery charger 2. The wiring drop voltage is greater since the charge current is greater at the starting time of the constant voltage charge, and becomes smaller since the charge current is reduced according to progress of the constant voltage charge. Therefore, according to the progress of the constant voltage charge, the terminal voltage of the battery 1c rises even if the output voltage of the main circuit 2b is fixed. Accordingly, in order to prevent the battery from being excessively charged by the wiring drop voltage, it is desirable to set the impedance of the wiring connecting the battery pack and the battery charger sufficiently smaller, or set the reference voltage value while taking into consideration the fluctuation of the wiring drop voltage.

Figure 3:
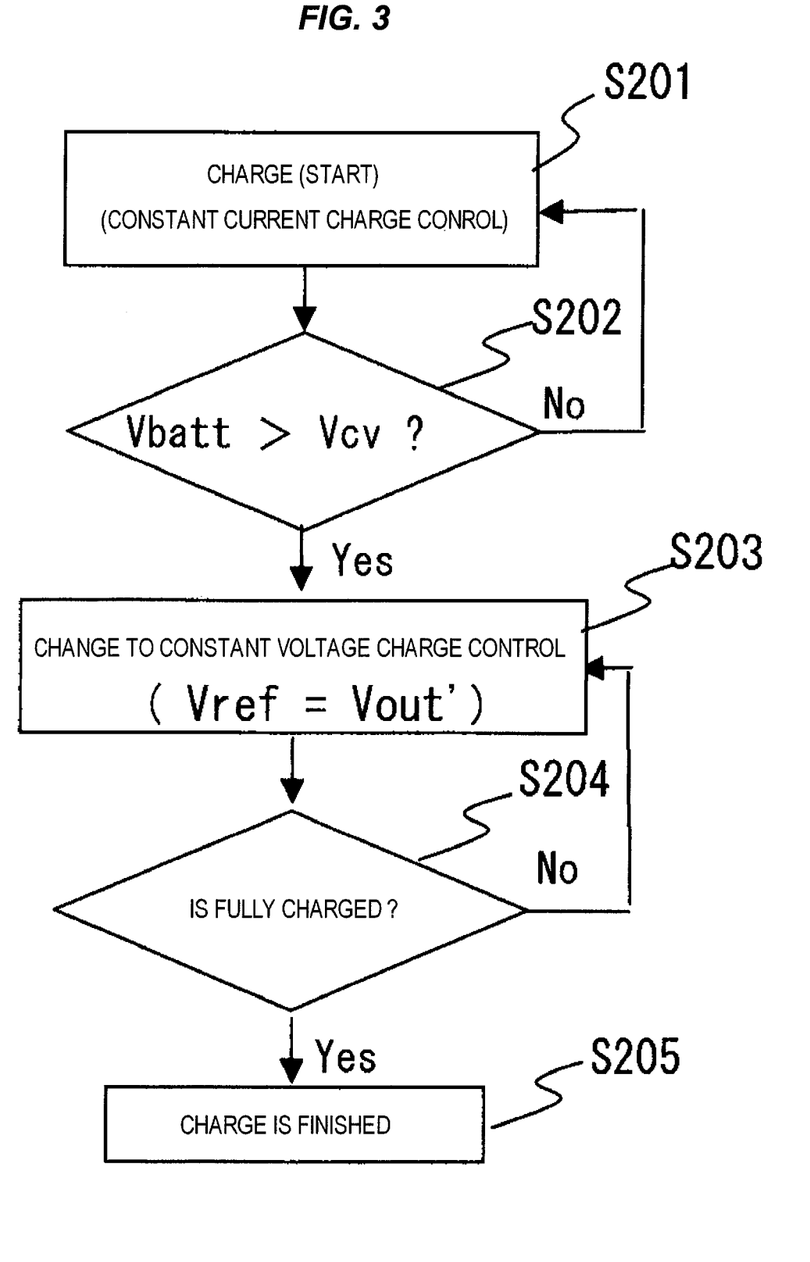
FIG. 3 is a flow chart of a control process which a main control circuit of a battery charger in a power storage system shown in FIG. 1 executes.

A description will be given of a control process executed by the main control circuit 2c in the charge of the secondary battery 1c in the power storage system structured as mentioned above, with reference to a control process flow chart shown in FIG. 3.

Step S201

The step sets the main circuit 2b to a charge control mode for controlling the constant current charge, and constant current charge controls the main circuit 2b while monitoring the output current detection value Iout of the main circuit 2b input from the output current detection circuit 2d so that the output current Iout of the main circuit 2b coming to the charge current comes to a charge current control target value Iref. The charge current control target value Iref at this time is assumed to be a rated charge current value Ilimit of the secondary battery 1c.

Step S202

The step compares the value of the terminal voltage Vbatt which is transmitted from the battery control circuit 1e with the previously set reference voltage value Vcv, and carries on the constant current charge control in the charge state in which the terminal voltage Vbatt of the secondary battery 1c is equal to or lower than the reference voltage value Vcv. Further, in the case that the terminal voltage Vbatt of the secondary battery 1c goes beyond the reference voltage value Vcv, the step changes to a process of switching the charge control mode to the constant voltage charge control.

Step S203

The step switches the main circuit 2b to the charge control mode for controlling the constant voltage charge, and constant voltage charge controls the main circuit 2b so that the output voltage detection value Vout' becomes equal to the charge voltage control target value Vref while monitoring the output voltage detection value Vout' of the main circuit 2b input from the output voltage detection circuit 2e. The constant voltage control target value Vref at this time is set to the output voltage detection value Vout' of the main circuit 2b when the terminal voltage Vbatt of the secondary battery 1c goes beyond the reference voltage value Vcv in the constant current charge control (Vref=Vout').

Step S204

The step compares the value of the output current detection value (the charge current value) Iout with a previously set charge completion target value Imin, and carries on the constant voltage charge control in a charge state in which the output current detection value Iout is lower than the charge completion target value Imin. Further, the step determines a full charge (prescribed amount) state in the case that the output current detection value Iout reaches the charge completion target value Imin, and changes to the next process.

Step S205

The step finishes the charge.

According to the charge control mentioned above, since the battery charger 2 is structured such as to control the main circuit 2b so as to carry out the constant voltage charge by setting the output voltage detection value Vout' of the main circuit 2b when the terminal voltage Vbatt of the battery 1c goes beyond the constant voltage target value Vcv in the constant current charge to the charge voltage control target value Vref, it is possible to accurately charge the secondary battery 1c to the prescribed amount safely without improving the output voltage detection precision of the output voltage detection circuit 2e in the battery charger 2, without carrying out the output voltage calibrating work at the shipping time, and without deteriorating the service life of the secondary battery 1c.

The determination of the full charge mentioned above may be modified to finish the charge by transmitting the charge current detection value (=the output current I out of the main circuit 2) which is output from the battery voltage and current detection circuit 1d with high detection precision of the battery pack 1 to the main control circuit 2c from the battery control circuit 1e of the battery pack 1 via the auxiliary control circuit 2f of the battery charger 2, and determining the full charge (prescribed amount) state in the case that the charge current detection value transmitted from the auxiliary control circuit 2f reaches the charge completion target value Imin in the main control circuit 2c.

Further, the determination of the full charge may be modified to be carried out in the battery pack side. In this case, the charge completion target value Imin is set in the battery control circuit 1e of the battery pack 1, the full charge (prescribed amount) state is determined in the case that the charge current detection value reaches the charge completion target value Imin by monitoring the charge current detection value output from the battery voltage and current detection circuit 1d in the battery control circuit 1e, the full charge is informed the auxiliary control circuit 2f of the battery charger 2, and the main control circuit 2c of the battery charger 2 finishes the charge on the basis of the full charge information informed from the battery control circuit 1e of the battery pack 1.

Since the battery voltage and current detection circuit 1d is constructed with high detection precision, the modification mentioned above can more accurately achieve the determination of the full charge state.

Further, the following method can be employed as means for setting the reference voltage while taking into consideration the fluctuation of the wiring drop voltage as mentioned above. The charge to the full charge is executed by the initially set reference voltage value Vcv once at least. At this time, the terminal voltage detection value Vbatt' at the full charge time come to voltage which is higher at a degree of Vbatt'−Vcv than the reference voltage value Vcv under the influence of the wiring drop voltage. Consequently, the auxiliary control circuit 2f can constant voltage charge the more accurate battery pack terminal voltage in the next charge, by storing the value of Vbatt'−Vcv at the full charge time in a memory, and setting the reference voltage value Vcv' used for the next charge to a compensated value Vcv'=Vcv−(Vbatt'−Vcv).

Further, since the wiring impedance changes under the influence of the temperature, it is possible to more accurately constant voltage charge by detecting the temperature and compensating it.

Further, the charge control mentioned above can be applied in a structure in which a plurality of battery packs 1 are connected in parallel, or a structure in which a plurality of battery chargers 2 are connected in parallel. The control for switching to the constant voltage charge control from the constant current charge control at this time, and the constant voltage output control of the main circuit in the constant voltage charge control can be carried out in the same manner as the embodiment mentioned above.

In the structure in which a plurality of battery packs 1 are connected in parallel, more power storage energy can be stored in the power storage system. Further, since an overall output power of the battery charger is enlarged by connecting a plurality of battery chargers 2 in parallel, the battery having a great rated charge cab be charged for a short time.

As mentioned above, in the structure in which a plurality of battery packs 1 are connected in parallel, and the structure in which a plurality of battery chargers 2 are connected in parallel, there is an advantage that a power storage system which can freely change a power storage amount can be achieved.

Embodiment 2

The embodiment 2 relates to a power storage system structured such that a plurality of battery packs are connected in parallel so as to be charged by one battery charger.

Figure 4:
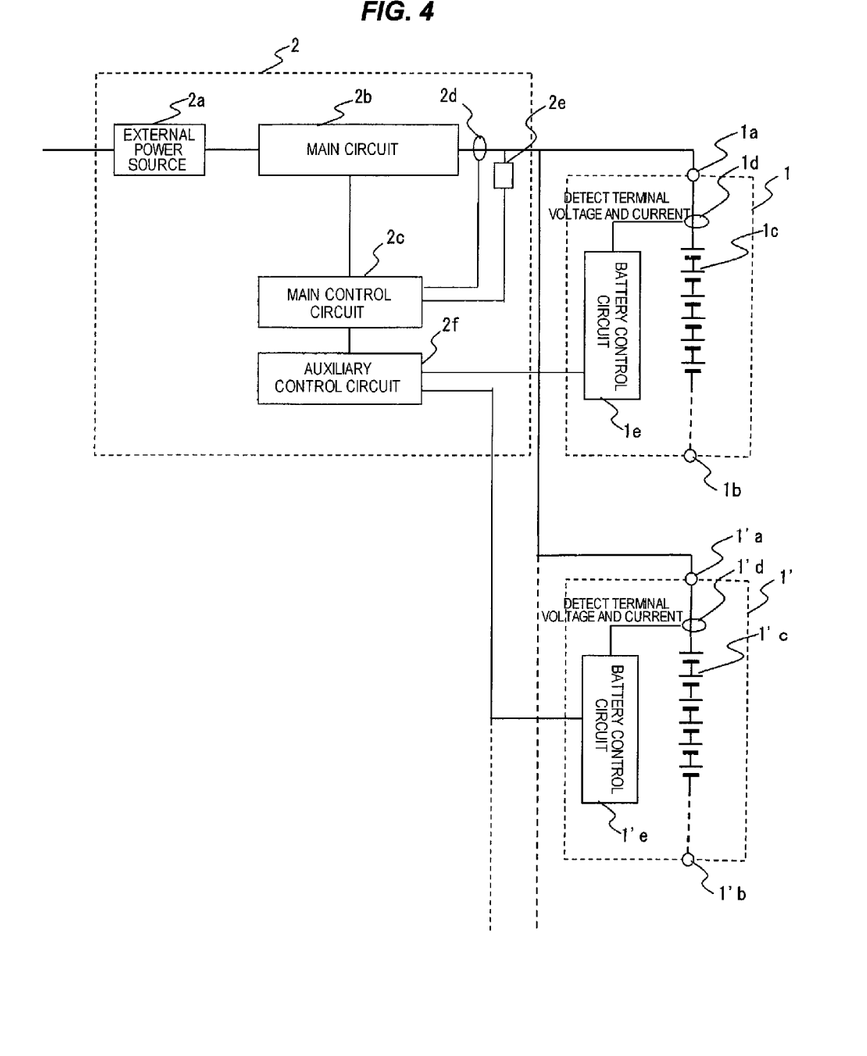
FIG. 4 is a block diagram of a power storage system and shows an embodiment 2 according to the present invention.

FIG. 4 is a block diagram of a power storage system structured such that two battery packs 1 and 1' are connected in parallel so as to be charged by one battery charger 2.

The charge of the battery pack 1 by the battery charger 2 is structured such as to be carried out in the same manner as the embodiment 1, and the charge of the battery pack 1' is carried out approximately in the same manner, however, the charge current control target value Iref is set to a value of sum of the rated charge current value I limit of the battery pack 1 and the rated charge current value I'limit of the battery pack 1'. Further, the auxiliary control circuit 2f of the battery charger 2 also inputs the value of the terminal voltage Vbatt from a battery control circuit 1'e of the battery pack 1', and informs the main control circuit 2c of the fact that the terminal voltage Vbatt of any of the parallel connected battery packs 1 and 1' goes beyond the reference voltage value Vcv so as to carry out the control for switching to the constant voltage charge control from the constant current charge control at the accurate terminal voltage (the terminal voltage detection value Vbatt). Even in this constant voltage charge control, the constant voltage control target value Vref is set to the output voltage detection value Vout' of the main circuit 2b when the terminal voltage Vbatt of the battery pack goes beyond the reference voltage value Vcv in the constant current charge control (Vref=Vout').

An overlapping description of the description of the embodiment mentioned above will be omitted.

Embodiment 3

The embodiment 3 relates to a power storage system structured such that one battery pack is charged by a plurality of battery chargers.

Figure 5:
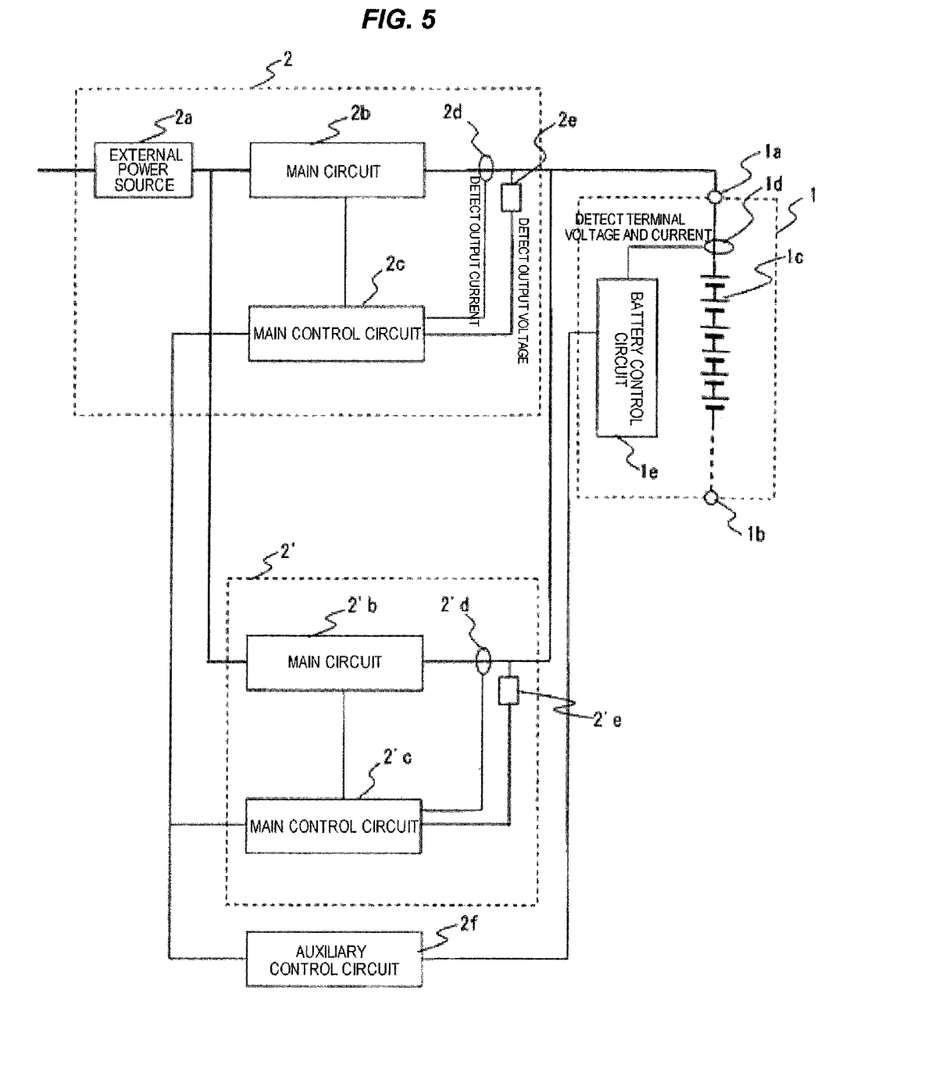
FIG. 5 is a block diagram of a power storage system and shows an embodiment 3 according to the present invention.

FIG. 5 is a block diagram of a power storage system structured such that one battery pack 1 is charged by two battery chargers 2 and 2'.

The auxiliary control circuit 2f is formed as an external auxiliary control circuit and is structured such as to be used in common by two battery chargers 2 and 2', the main circuits 2b and 2'b receive transmitted electricity in parallel from the external power source 2a, and the output terminal is structured such as to be connected to the battery pack 1 after being connected in common. Further, the respective main control circuits 2c and 2'c control the main circuits 2b and 2'b by setting a value obtained by dividing the rated charge current value I limit of the battery pack 1 into halves as the constant current charge control target value Iref in the constant current charge control.

Further, the auxiliary control circuit 2f informs the main control circuits 2c and 2'c of two battery chargers 2 and 2' at the same timing of the fact that the terminal voltage Vbatt of the battery pack 1 goes beyond the reference voltage value Vcv so as to carry out the control for switching to the constant voltage charge control from the constant current charge control at the accurate terminal voltage (terminal voltage detection value Vbatt). Even in the constant voltage charge control, the constant voltage control target values Vref of the respective main control circuits 2e and 2'e are respectively set to the respective output voltage detection values Vout' which are output from the output voltage detection circuits 2e and 2'e of the battery chargers 2 and 2' when the terminal voltage Vbatt of the battery pack 1 goes beyond the reference voltage value Vcv in the constant current charge control (Vref=Vout').

In the embodiment, since the main control circuits 2c and 2'c of two battery chargers 2 and 2' simultaneously switch to the constant voltage charge control from the constant current charge control according to the information signal from one common auxiliary control circuit 2f, it is possible to avoid confusion which is generated by difference of the switching timing. Further, since the constant voltage charge control carries out the constant voltage charge control by setting the output voltage detection values Vout' of the output voltage detection circuits 2e and 2'e in the respective main circuits 2b and 2'b at the switching time to the respective constant voltage control target values Vref, any deviation is not generated in the output voltage of each of the main circuits 2b and 2'b even if any different detection error exists in the output voltage detection circuits 2e and 2'e.

An overlapping description of the description of the embodiment mentioned above will be omitted.

Embodiment 4

The embodiment 4 relates to a power storage system structured such that a plurality of battery packs are charged in parallel by connecting a plurality of battery chargers in parallel.

Figure 6:
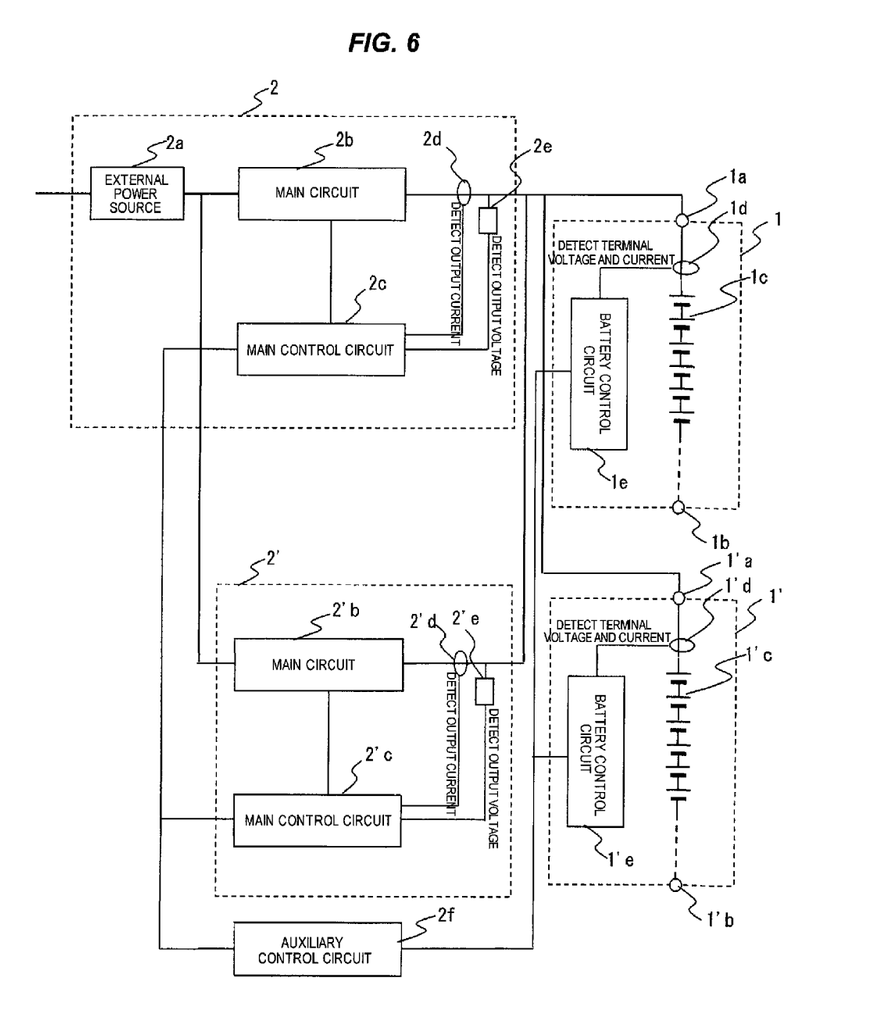
FIG. 6 is a block diagram of a power storage system and shows an embodiment 4 according to the present invention.

FIG. 6 is a block diagram of a power storage system structured such that two battery packs 1 and 1' are charged in parallel by connecting two battery chargers 2 and 2' in parallel.

Two battery chargers 2 and 2' are structured, in the same manner as the power storage system described in the embodiment 3, such that the auxiliary control circuit 2f is formed as the external auxiliary control circuit and is used in common by two battery chargers 2 and 2', the main circuits 2b and 2'b receive the transmitted electricity in parallel from the external power source 2a, and the output terminal is structured such as to be connected in parallel to the battery packs 1 and 1' after being connected in common. The respective main control circuits 2c and 2'c control the main circuits 2b and 2'b by setting a value obtained by dividing the sum of the rated charge current values Ilimit and I'limit of the battery packs 1 and 1' into halves as the constant current charge control target value Iref in the constant current charge control.

Further, the auxiliary control circuit 2f informs the main control circuits 2c and 2'c of two battery chargers 2 and 2' of the fact that any of the terminal voltage Vbatt of the battery packs 1 and 1' goes beyond the reference voltage value Vcv so as to carry out the control for switching to the constant voltage charge control from the constant current charge control at the accurate terminal voltage (terminal voltage detection value Vbatt). Even in the constant voltage charge control, the constant voltage control target values Vref of the respective main control circuits 2e and 2'e are respectively set to the respective output voltage detection values Vout' which are output from the output voltage detection circuits 2e and 2'e of the battery chargers 2 and 2' when the terminal voltage Vbatt of any of the battery packs 1 and 1' goes beyond the reference voltage value Vcv in the constant current charge control (Vref=Vout').

An overlapping description of the description of the embodiment mentioned above will be omitted.

What is claimed is:
1. A power storage system comprising:
battery charger which charges a battery pack having a battery and a battery voltage detection circuit detecting a terminal voltage of the battery, wherein said battery charger is structured such as to acquire terminal voltage information of the battery from the battery voltage detection circuit of the battery pack in a charging process, carry out a constant current charge control in a state in which the terminal voltage of the battery is equal to or lower than a previously determined reference voltage value of said battery and switch to a constant voltage charge control maintaining the output voltage of the battery charger in the case that the terminal voltage of the battery goes beyond said reference voltage value, thereby carrying on the charge until the battery is fully charged,
wherein said battery charger comprises:
at least one main circuit which supplies electric power to the battery pack;
at least one main control circuit which controls an output current and an output voltage of said at least one main circuit;
at least one output current detection circuit which detects a magnitude of the output current of said at least one main circuit so as to input to said at least one main control circuit;
at least one output voltage detection circuit which detects a magnitude of the output voltage of said at least one main circuit so as to input to said at least one main control circuit; and an auxiliary control circuit which acquires a terminal voltage of the batter in said batter pack, compares the acquired terminal voltage with the previously determined reference voltage value, and informs said at least one main control circuit of the fact that the terminal voltage goes beyond the reference voltage value, and
wherein said at least one main control circuit refers to an output current value which is input from said at least one output current detection circuit, an output voltage value which is input from said at least one output voltage detection circuit, and an information signal which is input from the auxiliary control circuit, controls said at least one main circuit so that said at least one main circuit sets a rated charge current value of the battery pack as a charge current control target value so as to carry out a constant current charge in a state in which the information signal is not input, and controls said at least one main circuit so that said at least one main circuit sets an output voltage value of said at least one main circuit when the terminal voltage of the battery goes beyond the reference voltage value as a charge voltage control target value so as to carry out a constant voltage charge in a state in which the information signal is input.

2. The power storage system according to claim 1, wherein a plurality of battery packs are connected in parallel, and wherein said auxiliary control circuit is configured to acquire the terminal voltage of the battery in each of the battery packs.

3. The power storage system according to claim 1, wherein a plurality of battery packs are connected in parallel, and said auxiliary control circuit acquires the terminal voltage of the battery in each of the battery packs, wherein each of the battery packs comprises a battery current and voltage detection circuit, wherein determination of said full charge is carried out by monitoring whether or not the combined current detection value outputs from the battery current detection circuits of the battery packs reaches a charge completion target value.

4. The power storage system according to claim 1, wherein a plurality of battery packs are connected in parallel, and said auxiliary control circuit acquires the terminal voltage of the battery in each of the battery packs,
wherein each of the battery packs comprises a battery current and voltage detection circuit, and determination of said full charge is carried out by monitoring whether or not the combined current detection value outputs from the battery current detection circuits of the battery packs reaches a charge completion target value, and wherein a constant voltage charge control is executed by setting a charge voltage control target value obtained by compensating a voltage drop amount caused by a wiring impedance between the battery charger and the battery packs.

5. The power storage system according to claim 1, wherein said battery charger is constructed by a plurality of battery chargers which are connected in parallel, wherein each of the battery chargers connected in parallel comprises:
a respective main circuit which supplies electric power to the battery pack;
a respective main control circuit which controls an output current and an output voltage of said respective main circuit;
a respective output current detection circuit which detects a magnitude of the output current of said respective main circuit so as to input to said respective main control circuit; and
a respective output voltage detection circuit which detects a magnitude of the output voltage of said respective main circuit so as to input to said respective main control circuit,
wherein said plurality of battery chargers include said auxiliary control circuit which acquires a terminal voltage of the battery in said battery pack, compares the acquired terminal voltage with the previously determined reference voltage value, and informs each of respective main control circuits of the fact that the terminal voltage goes beyond the reference voltage value, the auxiliary control circuit being in common provided in said plurality of battery chargers connected in parallel, and
wherein each of said respective main control circuits refers to an output current value which is input from the respective output current detection circuit within the respective battery charger, an output voltage value which is input from the respective output voltage detection circuit, and an information signal which is input from the auxiliary control circuit, controls the respective main circuit so that said respective main circuit sets a rated charge current value of the battery pack as a charge current control target value so as to carry out a constant current charge in a state in which the information signal is not input, and controls said respective main circuit so that said respective main circuit sets an output voltage value of said respective main circuit when the terminal voltage of the battery goes beyond the reference voltage value as a charge voltage control target value so as to carry out a constant voltage charge in a state in which the information signal is input.

6. The power storage system according to claim 1, wherein said battery charger is constructed by a plurality of battery chargers which are connected in parallel, wherein each of the battery chargers connected in parallel comprises:
a respective main circuit which supplies electric power to the battery pack;
a respective main control circuit which controls an output current and an output voltage of said respective main circuit;
a respective output current detection circuit which detects a magnitude of the output current of said respective main circuit so as to input to said respective main control circuit; and
a respective output voltage detection circuit which detects a magnitude of the output voltage of said respective main circuit so as to input to said respective main control circuit,
wherein the plurality of battery chargers comprise said auxiliary control circuit which acquires a terminal voltage of the battery in said battery pack, compares the acquired terminal voltage with the previously determined reference voltage value, and informs each of the respective main control circuits of the fact that the terminal voltage goes beyond the reference voltage value, the auxiliary control circuit being in common provided in said plurality of battery chargers connected in parallel, and
wherein each of said respective main control circuits refers to an output current value which is input from the respective output current detection circuit within the respective battery charger, an output voltage value which is input from the respective output voltage detection circuit, and an information signal which is input from the auxiliary control circuit, controls said respective main circuit so that said respective main circuit sets a rated charge current value of the battery pack as a charge current control target value so as to carry out a constant current charge in a state in which the information signal is not input, and controls said respective main circuit so that said respective main circuit sets an output voltage value of said respective main circuit when the terminal voltage of the battery goes beyond the reference voltage value as a charge voltage control target value so as to carry out a constant voltage charge in a state in which the information signal is input, wherein a plurality of battery packs are connected in parallel, and said auxiliary control circuit acquires the terminal voltage of a battery in each of the battery packs.

7. The power storage system according to claim 1, wherein said battery charger is constructed by a plurality of battery chargers which are connected in parallel, wherein each the battery chargers connected in parallel comprises:

a respective main circuit which supplies electric power to the battery pack;

a respective main control circuit which controls an output current and an output voltage of said respective main circuit;

a respective output current detection circuit which detects a magnitude of the output current of said respective main circuit so as to input to said respective main control circuit; and a respective output voltage detection circuit which detects a magnitude of the output voltage of said respective main circuit so as to input to said respective main control circuit, wherein said plurality of battery chargers comprise said auxiliary control circuit which acquires a terminal voltage of the battery in said battery pack, compares the acquired terminal voltage with the previously determined reference voltage value, and informs each of the respective main control circuits of the fact that the terminal voltage goes beyond the reference voltage value, the auxiliary control circuit being in common provided in said plurality of battery chargers connected in parallel, and wherein each of said respective main control circuits refers to an output current value which is input from the respective output current detection circuit within the respective battery charger, an output voltage value which is input from the respective output voltage detection circuit, and an information signal which is input from the auxiliary control circuit, controls said respective main circuit so that said respective main circuit sets a rated charge current value of the battery pack as a charge current control target value so as to carry out a constant current charge in a state in which the information signal is not input, and controls said respective main circuit so that said respective main circuit sets an output voltage value of said respective main circuit when the terminal voltage of the battery goes beyond the reference voltage value as a charge voltage control target value so as to carry out a constant voltage charge in a state in which the information signal is input, wherein a plurality of battery packs are connected in parallel, and said auxiliary control circuit acquires the terminal voltage of a battery in each of the battery packs, each of the battery packs comprises a battery current and voltage detection circuit, and determination of said full charge is carried out by monitoring whether or not a current detection value output from the battery current detection circuit of each of the battery packs reaches a charge completion target value.

8. The power storage system according to claim 1, wherein said battery charger is constructed by a plurality of battery chargers which are connected in parallel, wherein each of the battery chargers connected in parallel comprises:

a respective main circuit which supplies electric power to the battery pack;

a respective main control circuit which controls an output current and an output voltage of said respective main circuit; and a respective output voltage detection circuit which detects a magnitude of the output voltage of said respective main circuit so as to input to said respective main control circuit, a respective output current detection circuit which detects a magnitude of the output current of said respective main circuit so as to input to said respective main control circuit;

wherein said plurality of battery chargers comprise said auxiliary control circuit which acquires a terminal voltage of the battery in said battery pack, compares the acquired terminal voltage with the previously determined reference voltage value, and informs each of the respective main control circuits of the fact that the terminal voltage goes beyond the reference voltage value, the auxiliary control circuit being in common provided in said plurality of battery chargers connected in parallel, and wherein each of said respective main control circuits refers to an output current value which is input from the respective output current detection circuit within the respective battery charger, an output voltage value which is input from the respective output voltage detection circuit, and an information signal which is input from the auxiliary control circuit, controls said respective main circuit so that said respective main circuit sets a rated charge current value of the battery pack as a charge current control target value so as to carry out a constant current charge in a state in which the information signal is not input, and controls said respective main circuit so that said respective main circuit sets an output voltage value of said respective main circuit when the terminal voltage of the battery goes beyond the reference voltage value as a charge voltage control target value so as to carry out a constant voltage charge in a state in which the information signal is input, wherein a plurality of battery packs are connected in parallel, and said auxiliary control circuit acquires the terminal voltage of a battery in each of the battery packs, each of the battery packs comprises a battery current and voltage detection circuit, and determination of said full charge is carried out by monitoring whether or not a current detection value output from the battery current detection circuit of each of the battery packs reaches a charge completion target value, wherein a constant voltage charge control is executed by setting a charge voltage control target value obtained by compensating a voltage drop amount caused by a wiring impedance between the battery chargers and the battery packs.

\* \* \* \* \*